Figure 1:
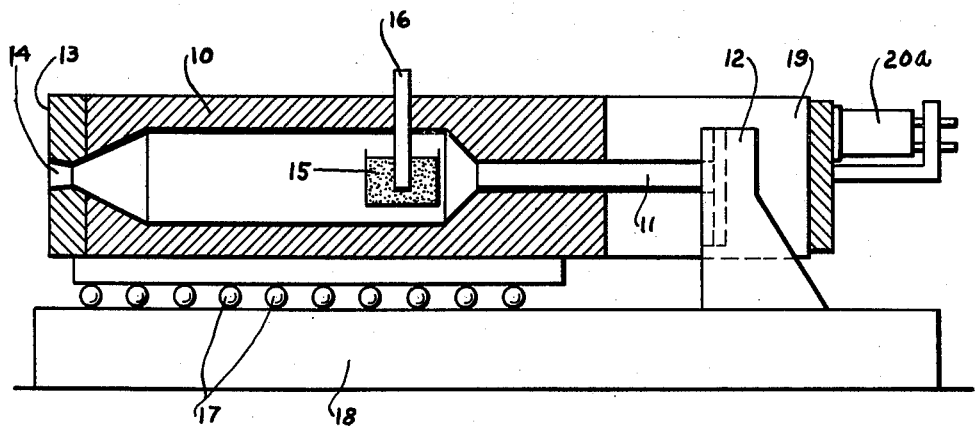

March 1, 1960  W. J. KROEGER ET AL  2,926,525
DIFFERENTIAL THRUST BOMB
Filed April 7, 1958

INVENTORS
WILLIAM J. KROEGER
AHMED D. KAFADAR
RAMON L. OLSON
BY
W. E. Thibodeau, J. J. Lynch
& H. R. Johns

United States Patent Office 2,926,525
Patented Mar. 1, 1960

2,926,525

DIFFERENTIAL THRUST BOMB

William J. Kroeger, Philadelphia, Pa., and Ahmed D. Kafadar, Chicago, and Ramon L. Olson, Homewood, Ill., assignors to the United States of America as represented by the Secretary of the Army Application April 7, 1958, Serial No. 727,012

6 Claims. (Cl. 73—167)

This invention relates to an apparatus for measuring the difference in thrust at a rear end of a cylinder simulating a recoiless gun whereby differences in thrust due to varying degrees of erosion in the venturi opening may be investigated. An object is to provide an apparatus adapted to function in the foregoing investigation. A further object is to adapt instrumentation to this device which will provide an accurate measure of the difference in thrust without being masked by extraneous vibrations of the system.

It has been customary to measure the total thrust of a rocket or equivalent device. With a recoiless rifle on the other hand the total thrust is due to pressure per unit area at each end times the area on which the pressure acts. In such a rifle the pressure acts on the projectile at one end and on the gases discharged through the nozzle at the other. The rearward force on the rifle due to the change in momentum of the projectile moving down the barrel is almost exactly balanced by the forward force on the rifle due to change in momentum of the gases escaping to the rear.

According to this invention it has been found desirable to provide a construction in which a stationary piston or plunger is provided on which a cylinder slides, the cross-sectional area of such a piston bearing a known relation to the area of a constriction of the venturi opening at the opposite end of the cylinder. The cylinder end wall may be removable and replaceable in order that different sizes of venturi throat openings may be substituted. When the area of the stationary piston is initially of the order of 1.3 times the throat area of the venturi; the forward thrust on the device due to the discharging gases is almost exactly balanced by the net rearward force due to the internal pressure acting on the rear face of the chamber. The exact value of this critical ratio of piston area to nozzle throat area is a known function of the geometry of the nozzle (ratio exit area to throat area, expansion angle, shape of the throat), properties of the propellant gas, and so on. Substitution of venturi openings having different degrees of wear in the venturi throat, without changing the piston area, composition of the propellant, or geometry of the nozzle, gives a means for measurement of the thrust due to the venturi opening. The thrust for each degree of wear measured enables the designers to know the changes in thrust with wear and thus determine what the useable life of a nozzle should be.

Similarly the effect of nozzle shape parameters may have been measured by holding throat area constant and varying shape of entrance, exit angle, ratio exit area to throat area and so on.

Referring to the drawings, Fig. 1 is a cross sectional view of an embodiment of this invention.

Figure 2:
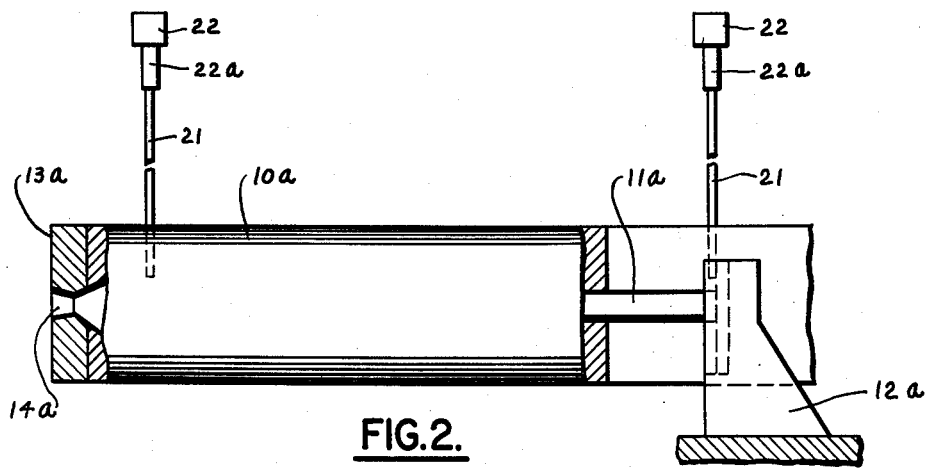

Fig. 2 shows the cylinder and piston of Fig. 1 mounted as the weight of a pendulum.

Figure 3:
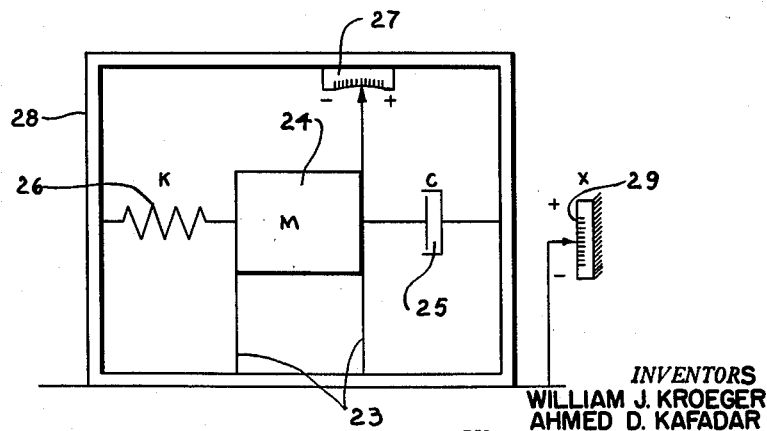

Fig. 3 exemplifies one construction of an accelerometer, there being more than one type available.

As shown in Fig. 1 a cylinder 10 is provided with a piston or plunger 11 engaging a stationary abutment 12 having an undercut vertical slot in which the end of the piston or plunger is received. A removable end wall 13 is provided therein with a venturi opening 14 of well known type. Within the cylinder a propellant 15 is fired by a primer 16, electrically or in other well known ways, and the cylinder 10 is mounted on roller bearings 17 on which the cylinder moves longitudinally of the base 18. The right end of the cylinder 19 is bifurcated in order to provide the stationary abutment 12 to which the piston is anchored, located between bifuractions.

The portion of the piston 11a in Fig. 2 within the abutment 12a is provided with a roller which enables the piston and cylinder to be tilted slightly with respect to the horizontal and at a right angle to the vertical axis of the abutment 12a. The rear end wall 13a is removable as before and is provided with a venturi opening 14a.

The cylinder 10a and piston 11a of Fig. 2 is provided with the same propellant, primer, firing means and bifurcated end with also the accelerometer 20a, that is shown in Fig. 1. Instead of being mounted on roller bearings, the cylinder in this embodiment is pivotally suspended by cables 21 from an overhead support 22 in order that the cylinder may swing as a pendulum under the impetus of the escaping gas through venturi opening 14a. Turnbuckles 22a assist in levelling the cylinder 10a. The pivotal support may be either side of each turnbuckle.

As shown in Fig. 3 one embodiment of an appropriate accelerometer is illustrated in this figure wherein cantilever spring guides 23 support the weight 24 and mechanical, or electrical damping means 25, prevents unnecessary vibration of the movable weight due to a variety of causes. A spring balance 26 or other force measuring means, is connected between an enclosing casing 28 and the weight 24. A scale 27 is for measuring motion of the weight 24 longitudinally of the cylinder and piston shown in Figs. 1 and 2. A scale 29 is for measuring the motion of the enclosing casing, other forms of accelerometer may be used in place of the one illustrated.

The operation of the cylinder 10 and 10a shown in Figs. 1 and 2 is believed to be within the ability of those skilled in the art. When the piston or plunger 11 has a cross sectional area substantially 1.3 times that of the cross sectional area of the constricted part of the venturi opening 14, then the only thrust tending to move the cylinder is that due to the escaping gas moving through the venturi opening. In order that the measurement of venturi openings of different shape and size may be measured, the end wall 13 in Fig. 1 and Fig. 2 is made removable in order that another end wall having a different size of opening may be substituted and such an opening may be in an end wall that has been subjected to considerable usage so that erosion has changed the shape and size of the venturi opening from what it was initially. Also the forward end wall of the cylinder may be removable in order that a piston of different size may be used with a venturi opening of a similar size. However the front wall need not necessarily be removable and the preferred embodiment in this invention does not contemplate that end wall being removable.

Among the advantages of this invention may be mentioned the fact that this apparatus is believed to be the first embodiment of a differential thrust bomb in which the forward and rearward thrust due to gas impinging on the front wall have been compensated and the sole thrust to which the cylinder is subjected, is that due to the gas issuing through the venturi opening, when the piston area is about 1.3 times that of the opening. Another advantage of the present invention is the discovery that a damped accelerometer was found to be superior as a thrust measuring means to that type of thrust measuring means which permitted more vibrations to take place. The damped accelerometer enables more acurate and more readable evidence to be recorded.

We claim:

1. In an apparatus having a forward and rearward thrust, said apparatus comprising a cylinder, a piston in said cylinder and adapted to extend out one end of the cylinder, an opposite end of said cylinder being provided with a venturi opening, and means for firing a charge of fuel in said cylinder, the combination therewith of the improvement for measuring the thrust due to the escape of gas through said venturi opening independently of a thrust on said piston, said improvement comprising means for securing said piston against movement during ejection of gas through said venturi opening, means for mounting said cylinder so that it may move longitudinally in a direction opposite to that of the issuing gases and with only small friction over said piston, and means for measuring the unbalanced thrust on said cylinder due to the issuance of gases through said venturi opening.

2. Apparatus according to claim 1 in which the pressure on the end wall of the cylinder around said piston and that on the opposite end wall around said venturi opening are approximately equal.

3. Apparatus according to claim 1 in which said thrust measuring means includes an accelerometer movable with said cylinder.

4. Apparatus according to claim 3 in which said accelerometer is of the damped type.

5. Apparatus according to claim 1 in which said cylinder is supported on antifriction bearings.

6. Apparatus according to claim 1 in which the cross sectional area of said piston is about 1.3 times that of a constricted portion of said venturi opening.

References Cited in the file of this patent

UNITED STATES PATENTS

| 2,111,315 | Damblanc | Mar. 15, 1938 |
| 2,601,778 | Gordon | July 1, 1952 |
| 2,641,056 | Eccleston | June 9, 1953 |
| 2,774,241 | Bennett | Dec. 18, 1956 |